3,770,807
PROCESS FOR PRODUCING γ-METHYL
GLUTAMATE
Shozo Sumikawa, Ikuji Mohri, and Masayuki Miyaji, Ube, Japan, assignors to Kyowa Hakko Kogyo Co., Ltd., Tokyo, Japan
Filed Nov. 16, 1971, Ser. No. 199,249
Claims priority, application Japan, Dec. 2, 1970, 45/105,945
Int. Cl. C07c 101/22
U.S. Cl. 260—482 P
3 Claims

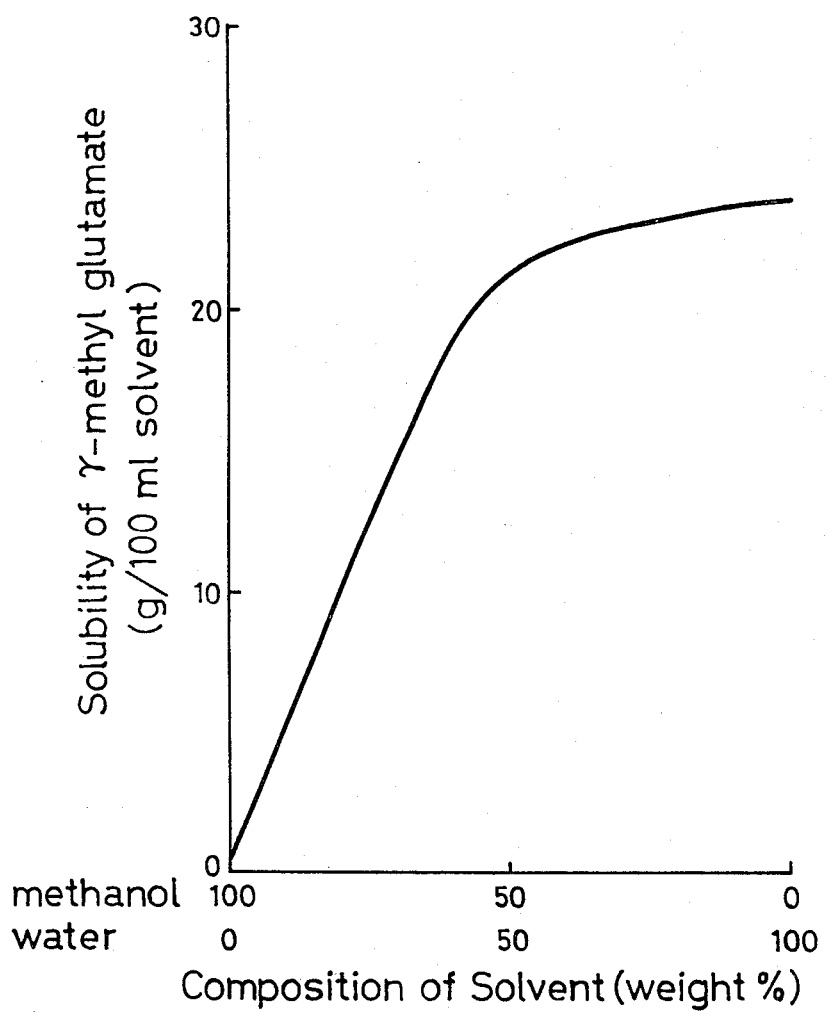

ABSTRACT OF THE DISCLOSURE

γ-Methyl glutamate is prepared from glutamic acid by treating glutamic acid with sulfuric acid in methanol. γ-Methyl glutamate is useful as an intermediate in the preparation of synthetic resins.

BACKGROUND OF THE INVENTION

This invention relates to a process for producing γ-methyl glutamate.

γ-Methyl glutamate is useful as an intermediate in the preparation of polyglutamate resins and fibers. Many processes for the preparation of γ-methyl glutamate have been proposed (see, for example, Japanese patent publication Nos. 11,965/1963, 6,656/1964, 24,441/1964, 24,878/1964, 26,251/1965, 6,263/1966, and U.S. Pat. 2,561,323). However, all of the proposed processes have certain disadvantages which create problems when used on an industrial scale. For example, some of the processes require the use of hydrogen chloride gas which, in addition to being expensive, is corrosive and requires special handling. In such reactions, the product is isolated in the form of the hydrochloride salt which is very hygroscopic and corrosive. Some of the known processes require the use of expensive and difficultly recoverable solvents for the isolation of γ-methyl glutamate.

According to the present invention, esterification of glutamic acid is effected by using sulfuric acid as the catalyst. The sulfuric acid is removed from the reaction mixture with an aqueous solution of an inorganic alkali. The ester is readily separated from the alkali metal salt due to the extreme solubility of the ester in the aqueous alcohol solvent.

According to the process of the present invention, glutamic acid is first esterified by the addition of sulfuric acid and methanol. The resulting reaction mixture is then neutralized with an aqueous solution of alkali. The crystals of alkali sulfate which form are removed by filtration and an aqueous methanolic solution of γ-methyl glutamate is obtained. The solution is then concentrated and methanol is added in order to crystallize the γ-methyl glutamate.

When glutamic acid is reacted with sulfuric acid and methanol, the carboxy group on the γ-position is first esterified. Generally, a molar ratio of 1.1–1.3 of sulfuric acid to glutamic acid is employed in the esterification step. A molar ratio of 10–30 of methanol to glutamic acid is preferred and the preferred reaction temperature is 20–30° C. When γ-methyl glutamate is prepared according to the present invention, the reaction product is mainly the γ-ester. The dimethyl ester, the α-ester and unreacted glutamic acid are also present but in small amounts. Generally, the reaction is carried out for about 60–120 minutes.

The product is obtained in the form of the γ-ester sulfate. The free ester is obtained by neutralization with alkali. As disclosed in the U.S. Pat. 2,561,323, amines can be employed as the base and γ-methyl glutamate is obtained in crystalline form. However, amines are expensive and require complicated recovery steps. According to the present process, an inexpensive inorganic alkali is employed. The reaction mixture is neutralized with an aqueous solution of inorganic alkali. The crystalline alkali metal sulfate which forms is separated, generally by filtration, and γ-methyl glutamate is recovered from the resulting solution. The loss of γ-ester caused by hydrolysis, or during the filtration of the alkali metal sulfate are temperature dependent. When the neutralizing temperature is maintained below about 15° C., no substantial hydrolysis of the ester occurs during neutralization. Further, the solubility of γ-methyl glutamate in a solvent system consisting of water and methanol at a temperature of about 10° C. is minute. FIG. 1 is a diagram showing the solubility of γ-methyl glutamate in a water-methanol solvent. γ-Methyl glutamate has a solubility of approximately 20 g./100 ml. when the methanol content of the solvent is about 60% by weight. At this point, the solubility of the alkali metal sulfate is essentially zero. The γ-methyl glutamate and the alkali sulfate can be completely separated from each other by appropriately adjusting the concentration of methanol. The alkali metal sulfates are removed from the reaction mixture in the form of crystals which are easily separable by filtration. As the alkali, alkali metal hydroxides such as potassium hydroxide and sodium hydroxide can be employed; alkali metal carbonates and bicarbonates can be employed.

The isolated γ-methyl glutamate solution contains a small amount of the di-ester and glutamic acid as impurities; however, crystalline γ-methyl glutamate of high purity can be obtained in high yield by concentration of the filtrate followed by the addition of methanol.

The process according to the present invention is more advantageous than current known processes in that inexpensive chemicals and solvents are employed. In addition, the reagents employed are not corrosive. The neutralized product is easily separated from the crystalline alkali sulfate by filtration and the mother liquor obtained after the crystallization of γ-methyl glutamate contains few impurities besides the di-ester and glutamic acid. As an added advantage, recovery of glutamic acid can be effected by hydrolysis with a small amount of alkali.

The present invention is explained more in detail by the following examples.

EXAMPLE 1

Glutamic acid (70 g.) is suspended in 370 g. of methanol and the suspension is charged into a one liter flask provided with a stirrer. Sulfuric acid (56 g.) is added dropwise thereto while maintaining the temperature of the suspension at 27° C. After the addition of sulfuric acid is complete, the mixture is kept at the resulting temperature for 120 minutes. The mixture is then cooled to 0° C. and to it is added dropwise a solution of 64 g. of potassium hydroxide in 230 g. of water. The temperature is maintained below 10° C. during the neutralization by cooling the flask. The slurry formed after neutralization is filtered off and the filter cake is washed with a mixture containing 60 g. of methanol and 40 g. of water, and dried. After drying, 99 g. of potassium sulfate are obtained.

The filtrate is combined with the washings and the mixture is concentrated in vacuo to a weight of 82 g. Methanol (80 g.) is added to the concentrate, and the crystals which form are separated by filtration, and washed with methanol. Upon drying, 65.5 g. (80% of the theoretical yield) of γ-methyl glutamate, having a melting point fo 193° C., are obtained. The product gives only one spot on a paper chromatogram. The purity is 99.5% based on the nitrogen content as determined by the Kjeldahl method.

EXAMPLE 2

γ-Methyl glutamate, prepared in the same manner as in Example 1, is neutralized in the same manner as in Example 1 except that a solution of 46 g. of sodium hydroxide in 330 g. of water is used in place of the aqueous solution of potassium hydroxide. After the dropwise addition of the alkali, the slurry obtained is filtered, and the filter cake is washed with a mixed solution of methanol (120 g.) and water (80 g.). Upon drying, 59 g. (77% of the theoretical yield) of crystalline γ-methyl glutamate are obtained having a melting point of 192° C. The product gives only one spot on a paper chromatogram. The purity of the product is 99% based on the nitrogen content as determined by the Kjeldahl method.

EXAMPLE 3

γ-Methyl glutamate is prepared as in Example 1, except that a solution of 79 g. of potassium carbonate in 240 g. of water is used in place of the aqueous solution of potassium hydroxide. Upon drying the product, 61.0 g. of γ-methyl glutamate having a purity of 99.5% are obtained.

Example 4

γ-Methyl glutamate is prepared as in Example 1, except that a solution of 92 g. of sodium bicarbonate in 330 g. of water is used in place of the aqueous solution of potassium hydroxide. Upon drying the product, 60 g. of γ-methyl glutamate having a purity of 99% are obtained.

What is claimed is:

1. A process for producing γ-methyl glutamate which comprises treating glutamic acid with methanol and sulfuric acid to effect esterification, neutralizing the resulting reaction mixture with an aqueous solution of a base selected from alkali metal hydroxides, carbonates and bicarbonates, separating the crystalline alkali metal sulfate formed, adding methanol to the filtrate to precipitate the γ-methyl glutamate and recovering the γ-methyl glutamate from the resultant mixture.

2. The process according to claim 1 wherein the alkali metal is potassium.

3. The process according to claim 1 wherein the alkali metal is sodium.

References Cited

FOREIGN PATENTS 517,081   10/1955   Canada _____ 260—482 P

LORRAINE A. WEINBERGER, Primary Examiner

P. J. KILLOS, Assistant Examiner